(12) United States Patent
Pollack et al.

(10) Patent No.: US 6,578,025 B1
(45) Date of Patent: *Jun. 10, 2003

(54) METHOD AND APPARATUS FOR DISTRIBUTING INFORMATION TO USERS

(75) Inventors: Jordan Pollack, Sudbury, MA (US); Shaun Cutts, Somerville, MA (US); Andres Rodriguez, Newton, MA (US); Jeremy Stevenson, Waltham, MA (US); Zak Umanoff, Newton, MA (US)

(73) Assignee: Abuzz Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,779

(22) Filed: Jun. 11, 1999

(51) Int. Cl.[7] .......................... G06F 17/30; G06F 15/16
(52) U.S. Cl. .............................. 707/2; 707/5; 709/206
(58) Field of Search ............... 707/2–10; 709/217–219, 709/206, 316; 345/716; 395/200.01–209; 705/8; 706/45, 47, 925

(56) References Cited

U.S. PATENT DOCUMENTS

| | | |
|---|---|---|
| 5,283,856 A | 2/1994 | Gross et al. |
| 5,555,346 A | 9/1996 | Gross et al. |
| 5,590,269 A | 12/1996 | Kruse et al. ................. 395/209 |
| 5,619,648 A | 4/1997 | Canale et al. .......... 395/200.01 |
| 5,642,502 A | 6/1997 | Driscoll ....................... 395/605 |
| 5,649,186 A | 7/1997 | Ferguson .................... 395/610 |
| 5,706,497 A | 1/1998 | Takshashi et al. .......... 395/605 |
| 5,717,913 A | 2/1998 | Driscoll |
| 5,724,567 A * | 3/1998 | Rose et al. ...................... 707/2 |
| 5,737,728 A | 4/1998 | Sisley et al. .................... 705/8 |
| 5,799,304 A | 8/1998 | Miller |
| 5,819,267 A | 10/1998 | Uyama ........................... 707/6 |
| 5,819,269 A | 10/1998 | Uomini ........................... 707/7 |
| 5,822,527 A | 10/1998 | Post ....................... 395/200.36 |
| 5,826,022 A | 10/1998 | Nielsen |
| 5,867,799 A | 2/1999 | Lang et al. ..................... 707/1 |
| 5,870,744 A | 2/1999 | Sprague ........................... 707/9 |
| 5,909,679 A | 6/1999 | Hall ................................ 707/4 |
| 5,999,932 A | 12/1999 | Paul |
| 6,029,195 A * | 2/2000 | Herz .......................... 709/219 |
| 6,052,709 A | 4/2000 | Paul |
| 6,072,942 A | 6/2000 | Stockwell et al. |
| 6,119,114 A | 9/2000 | Smadja |
| 6,189,002 B1 | 2/2001 | Roitblat |
| 6,249,805 B1 | 6/2001 | Fleming, III |
| 6,266,692 B1 | 7/2001 | Greenstein |
| 6,393,423 B1 | 5/2002 | Goedken |

OTHER PUBLICATIONS

U.S. patent application Publication No.: US 2002/0010804 A1, Publication Date: Jan. 24, 2002, (Sanghvi et al.).
U.S. patent application Publication No.: US 2002/0016735 A1, Publication Date: Feb. 7, 2002, (Runge et al.).

(List continued on next page.)

Primary Examiner—Safet Metjahic
Assistant Examiner—Te Yu Chen
(74) Attorney, Agent, or Firm—Wolf, Greenfield & Sacks, P.C.

(57) ABSTRACT

A method and apparatus for providing information to a plurality of users based on the relevancy of the information to the users are disclosed. An incoming message is received. Similarity scores are generated indicating similarities of the incoming message to features of a plurality of messages. Relevancy scores are generated for the plurality of users, the relevancy scores indicating relevancies of the incoming message to the plurality of users based on the similarity scores and a plurality of user profiles including information descriptive of the plurality of users' preferences for the features of the plurality of users. Message information derived from the incoming message, the relevancy scores, and the plurality of user profiles is delivered to at least some of the plurality of users.

108 Claims, 5 Drawing Sheets

OTHER PUBLICATIONS

Robert Kass, et al., "Intelligent Assistance for the Communication of Information in Large Organizations", pp. 171–178, EDS Center for Advanced Research.

Ernst Lutz, et al., "MAFIA—An Active Mail–FIlter–Agent for an Intelligent Document Processing Support", pp. 235–251, Multi–User Interfaces and Applications, 1990.

Marx, et al., "CLUES: Dynamic Personalized Message Filtering", pp. 113–121, MIT Media Laboratory, Speech Research Group, 1996..

Irene Stadnyk, et al., "Modeling User's Interests in Information Filters", pp. 49–50, Communications of the ACM, vol. 35, No. 12, Dec. 1992.

http://www.echomail.com/main.html, 12 pages, Printed on Aug. 4, 1999 14:16:42.

* cited by examiner

|     | $u_0$ | $u_1$ | $u_2$ | $u_3$ | $u_4$ | $u_5$ | $u_6$ | $u_7$ | $u_8$ | $u_9$ |
| --- | --- | --- | --- | --- | --- | --- | --- | --- | --- | --- |
| $m_0$ | .21 | .25 | .81 | -.60 | -.04 | .59 | .76 | .08 | .41 | .46 |
| $m_1$ | .76 | .27 | .86 | .54 | .24 | -.74 | .71 | .56 | -.56 | .21 |
| $m_2$ | -.84 | -.38 | .76 | .92 | .19 | -.56 | .75 | -.04 | -.39 | .34 |
| $m_3$ | .45 | .21 |  | -.85 | -.25 | -.68 |  | .47 | .55 | .50 |
| $m_4$ |  | .20 | .79 | -.52 |  | .60 | .75 | -.67 | .62 | .60 |
| $m_5$ | .09 | -.31 | .78 | -.64 | .15 | -.51 | .80 | .93 | .61 | .61 |
| $m_6$ | -.24 | .22 |  | .61 | .19 | .61 | .73 | -.96 | -.46 | .49 |
| $m_7$ | -.33 | .28 | .91 | .76 | -.13 | .48 | .72 | .91 |  | .32 |

Users

METHOD AND APPARATUS FOR DISTRIBUTING INFORMATION TO USERS

RELATED APPLICATIONS

This application is related to the following commonly owned applications, some of which disclose subject matter related to the disclosure of the present application, and which are hereby incorporated by reference in their entirety:

U.S. Utility Patent Application entitled "Method and Apparatus for Regulating Information Flow to Users," filed concurrently herewith under U.S. patent application Ser. No. 09/330,505; and U.S. Utility Patent Application entitled "Method and Apparatus for Evaluating Relevancy of Messages to Users," filed concurrently herewith under U.S. patent application Ser. No. 09/330,332.

BACKGROUND OF THE INVENTION

A variety of computer-based systems for facilitating communications among users have been developed. For example, electronic mail (email) systems allow users to send messages to one or more specified recipients. The specified recipients of a message may retrieve and read the message at any time, and may respond to the message or forward it to other users. Email systems typically provide the ability to create mailing lists to facilitate communication among groups of users having common roles or interests. News services (also referred to as "clipping services") deliver to users selected news articles covering topics of interest to the users. Such news services typically select which news articles to deliver to users by comparing words in the news articles to keywords provided by the users. Electronic bulletin board systems allow groups of users to create electronic bulletin boards, also referred to as "newsgroups," that typically correspond to a particular topic. Any user who subscribes to a newsgroup may post messages to the newsgroup and read messages posted to the newsgroup by other subscribed users. Electronic "chat rooms" enable users to communicate with each other in real-time by entering messages that are immediately communicated to and viewable by other users in the same chat room. The public Internet is increasingly being used as a medium for these and other forms of electronic communication.

One problem associated with such communication systems is that of "information overload." Users of such systems often find themselves presented with such a large volume of information (e.g., email messages or newsgroup postings) that they find it difficult or impossible to manually examine all of the information in order to identify the information that is relevant to them. As a result, users may fail to receive or read information that is relevant to them and to engage in potentially fruitful communications. Similarly, users who transmit information using such communications systems may fail to reach desirable recipients because such recipients are unable to separate relevant from irrelevant messages.

A variety of automated and semi-automated systems have been developed to help users organize and filter information received using electronic communications systems. For example, some systems attempt to deliver messages only to users to whom the messages are relevant. Such systems typically allow each user to define a set of preferences that indicate the user's interests. Such preferences may, for example, include keywords that describe the user's interests. Typically, such systems store incoming messages in a database as they are received by the system. When a certain number of messages have been received, the system performs a query on the database using each user's preferences. Each query typically produces scores for the messages in the database indicating the relative relevancies of the messages. The system uses these scores to determine which messages stored in the database are sufficiently relevant to forward to the corresponding user.

One problem with such conventional systems is that they require that multiple messages be received by the system before the relevancies of the messages can be determined. This requirement delays the delivery of incoming messages to users of the system. Such systems may therefore not be appropriate for environments in which communications need to be delivered quickly, such as enterprise email systems.

Another problem with such conventional systems is that their performance degrades as the number of system users increases. As described above, such systems perform a database query for each user of the system. The number of queries that must be performed therefore increases in proportion to the number of system users. Performance of such queries on large databases of messages can impose a significant load on the system and further delay the transmission of communications to appropriate recipients.

A further problem with such conventional systems is that users of such systems have limited control over the number and frequency of messages they receive from the system. Defining user preferences using keywords primarily serves to define the subject matter in which the user is interested, but does not place any bounds on the number or frequency of messages that the system will deliver to the user. As a result, users of such systems may experience "down" times during which they are ready and willing to receive, read, and respond to messages but during which they receive few messages or none at all. Similarly, users of such systems may be overloaded by a flood of messages that match the users' preferences. Such systems, therefore, fail to address a primary aspect of the problem of information overload.

Similar problems arise in systems that allow users to define a fixed relevancy threshold for incoming messages. Such systems compare the computed relevancy score of each incoming message to the fixed relevancy threshold defined by each user to determine whether to forward the incoming message to each user. When the system receives a large number of messages that exceed a user's relevancy threshold, the user will be overwhelmed with incoming messages. Similarly, when the system receives few messages that exceed a user's relevancy threshold, the user will receive few messages, even if the user is willing and available to read additional messages. Use of fixed thresholds, therefore, does not allow the frequency with which messages are delivered to users to change in response to the frequency and relevancy of incoming messages or to the preferences or activity levels of users.

Some systems allow users to set a fixed limit on the number of incoming messages to be delivered to them periodically (e.g., each day). The problems associated with such systems are similar to those described above. For example, if a large number of highly-relevant messages are received by the system in one day, the user will fail to receive relevant messages. Similarly, if the system receives many low-relevancy messages in one day, the user will receive few messages during the day, even if the user is willing and available to read more messages. Such systems, therefore, fail to respond to users' changing preferences and activity levels of users.

SUMMARY OF THE INVENTION

A system is provided that receives an incoming message and forwards the message to an appropriate set of users. The system may, for example, determine the relevancy of the incoming message to a plurality of users and forward the incoming message to only those users to whom the message is particularly relevant. Users may interactively control how frequently messages are delivered to them in order to avoid being overloaded with information. The incoming message may take any of a variety of forms, such as an email message, a newsgroup posting, a chat room message, or a news article. The message or any information derived from it may be delivered to the appropriate set of users in any of a variety of ways, such as by delivering the information using email, a web page, a newsgroup posting, or a file transfer.

In one aspect, a method for providing information to a plurality of users based on the relevancy of the information to the users is provided. The method includes steps of receiving an incoming message, generating similarity scores indicating similarities of the incoming message to features of a plurality of messages, generating relevancy scores for the plurality of users, the relevancy scores indicating relevancies of the incoming message to the plurality of users based on the similarity scores and a plurality of user profiles including information descriptive of the plurality of users' preferences for the features of the plurality of users, and delivering, to at least some of the plurality of users, message information derived from the incoming message, the relevancy scores, and the plurality of user profiles. The step of generating similarity scores may include steps of querying a message feature database using the incoming message to develop search results, the message feature database including records descriptive of the features of the plurality of messages, and generating the relevancy scores based on the search results.

The plurality of user profiles may include a preference matrix indicating preferences of the plurality of users for the features, and the step of generating relevancy scores may comprise a step of generating the relevancy scores by performing vector multiplication of a vector representing the similarity scores by vectors in the preference matrix. The relevancy scores may, however, be generated in any manner. The method may further comprise steps of receiving user feedback from one of the plurality of users and modifying the user's profile in the plurality of user profiles database based on the user feedback. The step of modifying the user's profile may include a step of receiving an indication from the user that the user has expressed a positive preference for the message information. The step of modifying the user's profile may include a step of receiving an indication from the user that the user has expressed a negative preference for the message information.

The plurality of user profiles may include relevancy thresholds for the plurality of users, and the step of delivering message information may include steps of comparing the relevancy scores to the relevancy thresholds and delivering the message information only to those users whose relevancy scores satisfy the corresponding relevancy thresholds. The plurality of user profiles may include a maximum number of users to whom the message information is to be delivered, and the step of delivering message information may include a step of delivering the message information to no greater than the maximum number of users. The plurality of user profiles may include a minimum number of users to whom the message information is to be delivered, and the step of delivering message information may include a step of delivering the message information to no fewer than the minimum number of users.

The step of delivering message information may include a step of sending the message information to the at least some of the plurality of users as at least one electronic mail message. The step of delivering message information may include a step of displaying the message information to a particular one of the plurality of users in a message display. The step of displaying the message information may include a step of: displaying the message information to the particular one of the plurality of users in a message display that indicates the relevancy score of the incoming message for the particular one of the plurality of users in relation to relevancy scores of other messages for the particular one of the plurality of users. The step of delivering the message information may include a step of responding to a request from a process executing on a client computer for message information satisfying specified criteria. The process may be associated with a particular one of the plurality of users, and the step of displaying the message information may include a step of responding to a request from the process executing on the client computer for message information corresponding to a specified number of messages having optimal relevancy scores for the particular one of the plurality of users.

Another method for providing information to the user based on the relevancy of the information to the user is also provided. The method includes steps of receiving an incoming message, generating a relevancy score for the user, the relevancy score indicating a relevancy of the incoming message to the user, determining whether the relevancy score of the incoming message satisfies the relevancy threshold, and delivering to the user message information derived from the incoming message and adjusting the relevancy threshold when the relevancy score of the incoming message satisfies the relevancy threshold. The method may further include a step of adjusting the relevancy threshold by an amount determined by a time-dependent function when the relevancy score of the incoming message does not satisfy the relevancy threshold. The step of delivering message information may include a step of adjusting the relevancy threshold by a function of the difference between the relevancy threshold and a maximum relevancy value. The step of delivering the message information may include a step of adjusting the relevancy threshold by a function of the difference between the relevancy threshold and an amount determined by a time-dependent function of the relevancy threshold.

Another method for providing information to the user based on the relevancy of the information to the user is also provided. The method includes steps of receiving an incoming message, generating a relevancy score for the user, the relevancy score indicating a relevancy of the incoming message to the user, calculating the relevancy threshold as a function of time, determining whether the relevancy score of the incoming message satisfies the relevancy threshold, and delivering the incoming message to the user when the relevancy score of the incoming message satisfies the relevancy threshold. The step of calculating may include a step of calculating the relevancy threshold as a function of time that is specified by the user. The step of calculating may include steps of receiving user.volume input from the user, the user volume input indicating a desired frequency of message delivery to the user, and calculating the function of time based on the user volume input.

A computer-readable medium and systems for providing information to a user based on the relevancy of the information to the user are also provided.

Other aspects of the invention include the various combinations of one or more of the foregoing aspects of the invention, as well as the combinations of one or more of the various embodiments thereof as found in the following detailed description or as may be derived therefrom. The foregoing aspects of the invention also have corresponding computerimplemented processes which are also aspects of the present invention. Other embodiments of the present invention may be derived by those of ordinary skill in the art both from the following detailed description of a particular embodiment of the invention and from the description and particular embodiment of a system in accordance with the invention.

BRIEF DESCRIPTION OF THE DRAWINGS

FIG. 2 is a diagram of an example of a preference matrix for storing preferences of users in a system for evaluating relevancy of messages to the users.

DETAILED DESCRIPTION

A system is provided that receives an incoming message and forwards the message to an appropriate set of users. The system may, for example, determine the relevancy of the incoming message to a plurality of users and forward the incoming message to only those users to whom the message is particularly relevant. Users may interactively control how frequently messages are delivered to them in order to avoid being overloaded with information. The incoming message may take any of a variety of forms, such as an email message, a newsgroup posting, a chat room message, or a news article. The message or any information derived from it may be delivered to the appropriate set of users in any of a variety of ways, such as by delivering the information using email, a web page, a newsgroup posting, or a file transfer.

In one aspect, a relevancy evaluation system is provided that evaluates the relevancy of incoming messages to each of one or more users. The relevancy of each incoming message to each of the users may be evaluated without waiting for the receipt of subsequent messages. The system also includes a delivery mechanism to deliver incoming messages to users. The delivery mechanism may, for example, be used to filter out messages based on their relevancy to each user and to deliver to each user only those messages that are particularly relevant to that user. Users may interactively modify the relevancy criteria used by the system and the manner in which the delivery mechanism determines whether to deliver messages to users.

Figure 1:
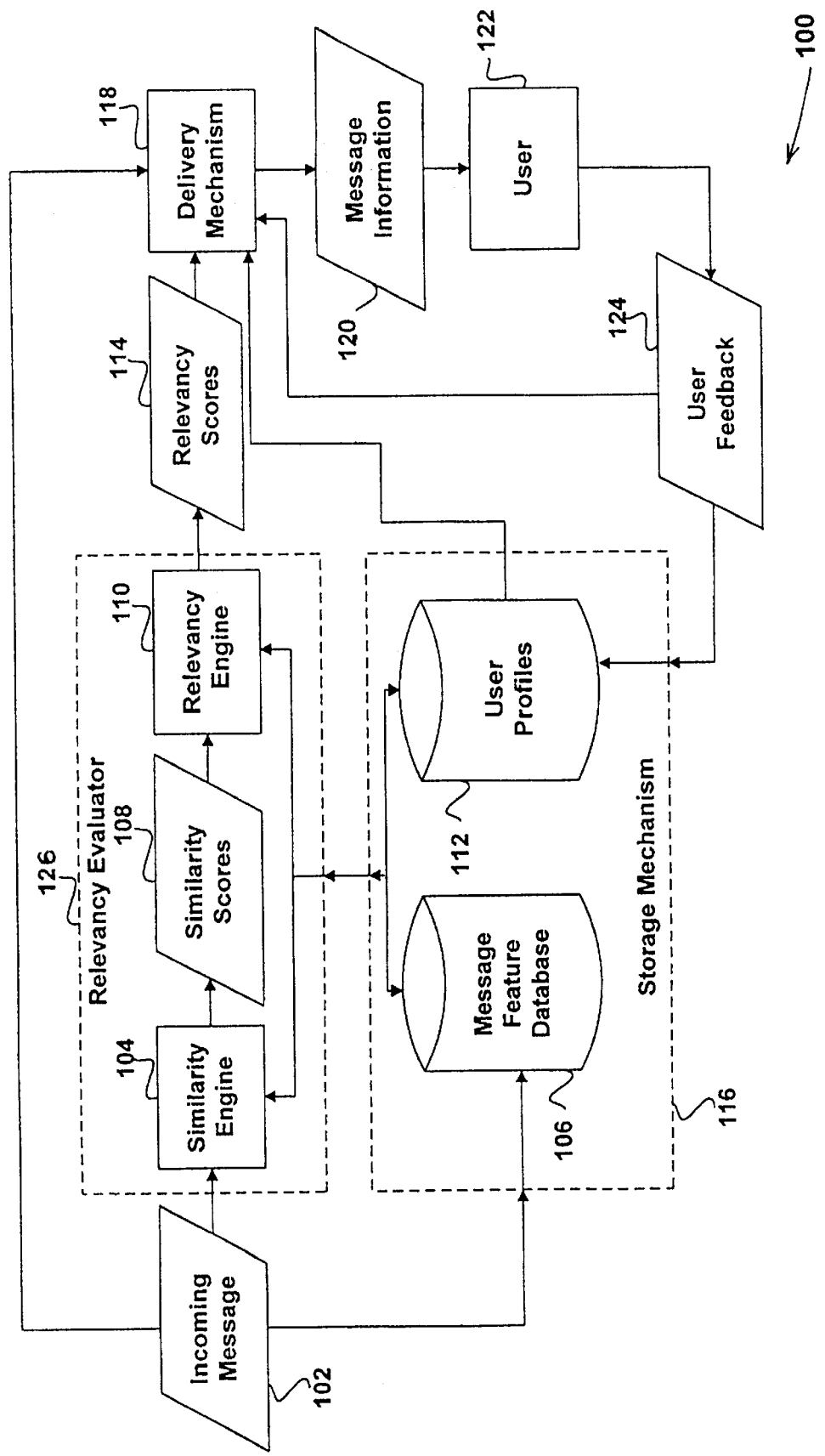
FIG. 1 is a dataflow diagram of a system for evaluating relevancy of messages to users.

For example, referring to FIG. 1, an example of an information distribution system 100 used by one or more users is shown. An incoming message 102 is received by the system 100. The incoming message 102 may, for example, be an electronic mail (email) message directed to one of the system's users. The incoming message is delivered as an input to a relevancy evaluator 126. The relevancy evaluator 114 generates relevancy scores 114 representing relevancies of the incoming message 102 to the users of the system 100.

Each of the relevancy scores 114 indicates a relevancy of the incoming message 102 to a particular user of the system 100.

The relevancy evaluator 126 may, for example, include a similarity engine 104, similarity scores 108, and a relevancy engine 110. The similarity engine 104 may, for example, be a standard text-based search engine such as Alta Vista, Verity, or a Wide Area Information Server (WAIS), which compare words in a search query with words in an index of documents maintained by the search engine. The similarity engine 104 may, for example, be an engine based on Latent Semantic Analysis, or use any other natural language analysis techniques such as word stemming or part-of-speech tagging. A storage mechanism 116 stores information related to user preferences and previous incoming messages received by the system 100. The storage mechanism 116 may, for example, include a message feature database 106 and user profiles 112. The message feature database 106 may, for example, contain records for a plurality of messages, such as previous incoming messages received by the system 100. When the similarity engine 104 is a standard search engine, the message feature database 106 may, for example, be a standard search engine index indexing a plurality of messages. The similarity engine 104 queries the message feature database 106 with the incoming message 102 to produce similarity scores 108. For example, a similarity score produced based on a comparison between the incoming message 102 and one of the previously-received messages in the message feature database 106 may be a floating point value between $S_{Min}$ and $S_{Max}$ indicating a degree of similarity between the incoming message 102 and the previously-received message. $S_{Min}$ and $S_{Max}$ may be any appropriate values, such as 0 and 1 or −1 and +1.

The similarity scores 108 and the user profiles 112 are delivered as an input to the relevancy engine 110. The relevancy engine 110 generates the relevancy scores 114 using the similarity scores 108 and the user profiles 112. The user profiles 112 include profiles of the users of the system 100. The user profiles 112 may include, for example, information descriptive of the users' preferences for at least some of the plurality of messages represented in the message feature database 106. The relevancy scores 114 may, for example, be floating point values ranging between $R_{Min}$ and $R_{Max}$ indicating the relevance of the incoming message 102 to the users of the system 100. $R_{Min}$ and $R_{Max}$ may be any appropriate values, such as 0 and 1 or −1 and +1.

The incoming message 102 and the relevancy scores 114 are provided to a delivery mechanism 118. An example of the delivery mechanism 120 is described in more detail below with respect to FIG. 3. The delivery mechanism 120 generates message information 120 from the relevancy scores 114 and the incoming message 102 and delivers the message information 120 to users of the system 100, such as a user 122. As described in more detail below, the message information 120 may include information derived from the incoming message 102 and/or information about the relevancy score of the incoming message 102 for the user 122. The incoming message 102 is also provided to the storage mechanism 116, which stores the incoming message 102 or information derived therefrom in the message feature database 106.

The user provides user feedback 124 to the storage mechanism 116 and/or the delivery mechanism 118. As described in more detail below, the user feedback 124 may, for example, be used to modify the profile of the user 122 in the user profiles 112. The user feedback 124 may also be used to modify the operation of the delivery mechanism 118.

To generate the relevancy scores 114, the relevancy evaluator 126 queries the storage mechanism 116 using the incoming message 102 as the query to generate the relevancy scores 114 as an output. This differs from conventional systems, which typically accumulate incoming messages over time into a message database, and then periodically use a search engine to query the message database once for each of a plurality of user profiles corresponding to users of the system. One advantage of the relevancy evaluator 126 shown in FIG. 1 is that it may evaluate the relevancy of the single incoming message 102, without waiting to receive additional incoming messages. A further advantage of the relevancy evaluator 126 of FIG. 1 is that it queries the storage mechanism 116 only once using the incoming message 102, rather than querying a message database multiple times using a plurality of user profiles. The relevancy of the incoming message 102 may, therefore, be performed more efficiently with the relevancy evaluator 126 than with conventional systems.

The message information 120 may be any information derived from or related to the incoming message 102. For example, the message information 120 may include a summary of the incoming message 102, a relevancy score of the incoming message 102, keywords extracted from the incoming message, a subject line of the incoming message, or the entire contents of the incoming message 102. The message information 120 may include information related to the incoming message 102, such as the time of receipt of the incoming message 102, the author of the incoming message 102, or the size of the incoming message 102.

As described in more detail below with respect to FIG. 3, the delivery mechanism 118 may deliver the message information 120 to the user 122 in any manner. For example, the message information 120 may be an email message including the contents of the incoming message 102, in which case the delivery mechanism 118 may be a combined filter and email server that sends the message information 120 to the user 122 using standard techniques for delivering email. Alternatively, the delivery mechanism 118 may post the message information 120 to a web page accessible to the user 122. The delivery mechanism may also update a message display using the message information 120. For example, the delivery mechanism 118 may maintain a message display that displays a predetermined number (e.g., 10) of messages received by the system 100 that are most relevant to the user 122. The display mechanism 118 may maintain such a message display for each user of the system 100. As new incoming messages are received by the system 100, the delivery mechanism 118 may update the users' message displays to display the most relevant messages to the users, ranked in order of relevance. When a user reads or selects a message, the delivery mechanism 118 may remove the message from the user's message display.

The delivery mechanism 118 may, for example, determine whether to deliver the message information 120 to the user using information contained in the incoming message 102, the relevancy scores 114, and the user profiles 112. For example, the user profiles 112 may include relevancy thresholds associated with users of the system 100. The delivery mechanism 118 may include a relevancy thresholder to compare the relevancy scores 114 to the relevancy thresholds to determine which of the relevancy scores 114 satisfy the corresponding relevancy thresholds. The delivery mechanism 118 may then only deliver the message information 120 to users whose relevancy scores satisfy their relevancy thresholds. Alternatively, the delivery mechanism 118 may, for example, take into account previous messages that have been delivered to a user when determining whether the incoming message 102 is relevant to the user. For example, the delivery mechanism 118 may take into account the amount of time that has passed since an incoming message has been delivered to the user when determining whether the current incoming message 102 is relevant to the user.

The delivery mechanism 118 may also maintain a minimum and maximum number of users to whom message information for all incoming messages should be delivered and ensure that message information for each incoming message is delivered to at least the minimum number of users and to no greater than the maximum number of users of the system 100. The delivery mechanism 118 may ensure that the message information 120 for each incoming message 102 is delivered to at least the minimum number of users in any of a number of ways. For example, if the delivery mechanism 118 determines that the relevancy scores 114 of the incoming message 102 satisfy the relevancy thresholds of fewer than the minimum number of users, the delivery mechanism 118 may deliver the message information 120 to enough additional users to ensure that the message information 120 is delivered to at least the minimum number of users. The additional users may be selected by, for example, selecting users for whom the relevancy score of the incoming message 102 is particularly high (when compared to the user's relevancy threshold). The delivery mechanism 118 may ensure that the message information 120 is delivered to no greater than the maximum number of users in any of a number of ways. For example, the delivery mechanism 118 may stop delivering the message information 120 after the message information has been delivered to the maximum number of users.

The system 100 shown in FIG. 1 has a number of benefits and advantages. For example, by thresholding the relevancy score of the incoming message for each user, the users of the system are presented only with those incoming messages that are sufficiently relevant to them. If users of the system 100 typically receive a large number of messages, including a large number of messages that are not sufficiently relevant to them to warrant attention, filtering of insufficiently relevant messages may allow such users to avoid spending a significant amount of time evaluating and/or reading insufficiently relevant messages.

Generating a separate relevancy score for the incoming message 102 for each user of the system 100 and maintaining separate user profiles 112 for each user of the system allows the system to behave according to the needs and preferences of individual users. For example, one user might adjust the relevancy threshold in his user profile to filter out all but the messages that are most relevant to him, while another user might adjust her relevancy threshold to filter out only the messages that are least relevant to her. Generation of separate relevancy scores 114 and maintenance of separate user profiles 112 for each user of the system 100 makes such customization possible.

A further advantage of the system 100 is that it may generate relevancy scores 114 for the incoming message 102 without waiting to receive subsequent incoming messages. Conventional systems typically queue a number of incoming messages and then generate relevancies of the incoming messages relative to each other. Such queuing increases the delay between the time that an incoming message is received and the time that the incoming message can be filtered and otherwise processed by the system. The system 100, in contrast, may evaluate the relevancy of a single incoming message (such as the incoming message 102) and filter or otherwise process the incoming message by itself, before receiving or processing any other incoming messages. As a result, results of evaluating the relevancy of the incoming message 102 may be communicated immediately to users of the system 100, such as by displaying the incoming message 102 to those users for whom the incoming message 102 is sufficiently relevant. Results of evaluating the relevancy of the incoming message 102 may also be communicated to users of the system 100 in other ways, such as by notifying the users of the results by email, facsimile, or telephone.

An additional advantage of the system 100 is that the user profiles 112 may be dynamically and interactively modified to influence the operation of the system 100. For example, as described in more detail below, the user 122 may interactively provide user feedback 124 to modify the user's profile in the user profiles 112 to reflect changes in his or her preferences. Such changes may be performed relatively quickly and may influence the relevancy evaluations performed by the system 100 immediately. In contrast, changes made to profiles of users in conventional systems typically are not made noticeable to the user until the next time the system processes a batch of incoming messages. As described above, such processing may only occur infrequently. As a result, users of such systems have limited control over the quality and quantity of messages that are delivered to them.

The elements of FIG. 1 will now be described in more detail. The incoming message 102 may be any kind of message, document, or data that may be broadcast or directed to one or more users. The incoming message 102 may, for example, be an electronic mail (email) message directed to one or more specified users. The incoming message 102 may also, for example, be a newsgroup posting, a message posted to a chat room, information derived from a web page, or information extracted from a database or other data store. The incoming message 102 may include any kind of data, such as text, graphics, images, sounds, or any combination thereof.

The similarity engine 104 may, for example, be a standard search engine that compares query text (e.g., the incoming message 102) to a database (e.g., the message feature database 106). Such a search engine compares the query text to records in the database and produces a score for each record in the database indicating whether and/or how closely the query text matches the record. The similarity engine 104 may use any of a variety of well-known methods for comparing the incoming message 102 to the message feature database 106 to produce the similarity scores 108. The similarity scores 108 may include scores for fewer than all of the records in the similarity engine database 100. For example, the similarity scores 108 may include scores only for those records in the message feature database 106 that match the incoming message 102 particularly well or particularly poorly.

Although, as described above, the message feature database 106 may contain records for previous incoming messages received by the system 100, the message feature database 106 is not limited to storing previous incoming messages. Rather, the message feature database 106 may include, for example, records corresponding to any feature of one or more messages. For example, the message feature database 106 may include abstracts or summaries of messages, combinations of messages that are similar to each other, or keywords derived from messages. The similarity scores 108 indicate the similarity of the incoming message 102 to the features represented in the message feature database 106. The messages represented in the message feature database 106 need not be messages previously transmitted using the system 100. Furthermore, the messages represented in the message feature database 106 may be any kind of documents or data. For example, the messages may be compressed messages, documents including keywords describing skills of employees, or employee resumes.

Although, as described above, the similarity scores 108 may be floating point values ranging between $S_{Min}$ and $S_{Max}$, indicating how well the records in the message feature database 106 match the incoming message 102, any of a variety of other scoring scales may be used. For example, the similarity scores 108 may be boolean values of either True or False, indicating whether particular records in the message feature database 106 match the incoming message 102. Although, as described above, higher similarity scores are more optimal scores than lower similarity scores, the similarity scores 108 may be arranged in any order.

The user profiles 112 may indicate preferences of the users of the system in any manner. For example, the user profiles 112 may include, for one or more users of the system 100, a preference value indicating a preference of the user for a particular one of the questions represented in the message feature database 106. Such preference values may, for example, be represented as a preference matrix in which columns correspond to users of the system and rows correspond to questions represented in the message feature database 106. Referring to FIG. 2, an example of a preference matrix 200 is shown, in which preference values range from $P_{Min}=0$ to $P_{Max}=1$. The preference matrix 200 includes columns $u_0$–$u_9$ corresponding to users of the system 100 and rows $m_0$–$m_7$ corresponding to previous incoming messages received by the system 100. The preference value $P_{c,r}$ stored in the preference matrix 200 at column c and row r corresponds to the preference of user $u_c$ to message $m_r$. For example, the preference matrix 200 indicates that the preference value corresponding to user $u_4$ and message $m_5$ is 0.15.

The preference value of a user with respect to a particular question may correspond to any of a number of characteristics of the user with respect to that question. For example, the messages represented in the message feature database 106 may be questions that have been asked of users of the system 100. In such a case, the preference value of a user for a question may indicate whether the user has previously responded to the question. For example, the preference value of a user for a question may be $P_{Max}$ if the user has responded to the question and $P_{Min}$ if the user has not responded to the question. Similarly, preference values may indicate degrees to which users have correctly answered questions represented in the message feature database 106. For example, preference values may be floating point values ranging from $P_{Min}$ to $P_{Max}$, where a preference value of $P_{Max}$ indicates that a user has answered a question entirely correctly and a preference value of $P_{Min}$ indicates that the user has answered the question entirely incorrectly. $P_{Min}$ and $P_{Max}$ may be any appropriate values, such as 0 and 1 or –1 and +1. Alternatively, preference values may indicate whether users have accepted or rejected questions, such as by using a value of one to indicate acceptance of a question and a value of zero to indicate rejection of a question.

The preference matrix 200 may be stored in a computer-readable medium in any manner. For example, the preference matrix 200 may be represented as a table in a database, as a multidimensional array, as an object according to an object-oriented programming language, a (singly- or doubly-) linked list, a two-dimensional hashing function, a sparse set of lists organized by row, a sparse set of lists organized by column, or as a sparse matrix. The preference matrix 200 may be distributed among a plurality of data structures or computer-readable media. For example, the portion of the preference matrix 200 corresponding to a particular user may be stored on the user's client computer to enable the client computer to generate relevancy scores for the user. Distributing the preference matrix 200 in this way enables multiprocessing of incoming messages and thereby increases the speed with which such messages may be processed.

Individual users may have multiple profiles in the user profiles 112. For example, a user may choose to create multiple profiles corresponding to multiple topics and to store messages that are particularly relevant to the user based on a particular profile in a bind corresponding to that profile. Each profile for a user may be assigned a distinct column in the preference matrix 200 so that columns in the preference matrix 200 correspond to user profiles rather than to users.

The user feedback 124 may take any of a variety of forms. For example, the user 122 may indicate in the user feedback 124 that the incoming message 102 is not of interest to the user 122. In response, the system 100 may update the user profiles 112 to indicate that the incoming message 102 is not of interest to the user 122. For example, the system 100 may modify the cell in the preference matrix 200 (FIG. 2) corresponding to the user 122 and the incoming message 102 to indicate that the user 122 is not interested in the incoming message (such as by changing the preference value in the cell to $P_{Min}$). The user feedback 124 may indicate an ordering of messages represented in the message feature database 106. For example, the user feedback 124 may indicate that the user 122 prefers a first message over a second message. In response to this feedback, the system 100 may then assign a more optimal (e.g., higher) preference value to the first message than to the second message for that user 122 in the user profiles 112. The system 100 may present a graphical display of the preference matrix 200 that is directly editable by the user 122, in which case the user feedback 124 represents changes made by the user 122 to the preference matrix 200. The techniques described above for updating the user profiles 112 in response to receipt of the user feedback 124 are provided merely for purposes of example and are not limiting; rather, the system 100 may update the user profiles 112 in response to receipt of the user feedback 124 in any of a variety of ways.

Modifications made to the user profiles 112 as a result of user input are immediately available for use in calculating relevancy scores 114 for subsequently-received incoming messages. The separation of the user profiles 112 from the message feature database 106 allows modifications to be made to the user profiles 112 particularly quickly and without causing noticeable delays to the users of the system 100. Such dynamic and adaptive modification of the user profiles 112 enables the system 100 to be responsive to changing needs and preferences of the system's users. For example, interactive modification of the user profiles 112 enables users to control the rate at which incoming messages are delivered to them, the degree to which incoming messages are filtered, and the number of messages displayed to them at any particular time.

The relevancy engine 110 may generate the relevancy scores 114 in any of a variety of ways. For example, if the user profiles 112 include a preference matrix, such as the preference matrix 200 shown in FIG. 2, the relevancy engine 110 may calculate the relevancy score of the incoming message 102 for a particular user by performing a vector multiplication of the incoming message 102 by the column in the preference matrix 200 corresponding to the user. For example, assume that the incoming message 102 produces the following vector S of similarity scores 108 (on a scale of $S_{Min}=0$ to $S_{Max}=1$): [0.02 0.98 0.44 0.52 0.37 0.99 0.31 0.89]. Each element $S_i$ in the vector S corresponds to the similarity score of the incoming message 102 with respect to message $m_i$. The relevancy engine 110 may generate a relevancy score of the incoming message 102 for a particular user, such as the user $u_4$, by multiplying the vector S by column $u_4$ in the preference matrix 200. The result is: (0.02*−0.04)+(0.98*0.24)+(0.44*0.19)+(0.52*−0.25)+ (0.37*0.06)+(0.99*0.15)+(0.31*0.19)+(0.89*−0.13)= 0.3019. The relevancy engine 110 may, however, generate a relevancy score for the incoming message 102 in any manner.

The relevancy engine 110 may normalize the relevancy scores 114 before providing them to the delivery mechanism 118. The relevancy engine 110 may, for example, apply a sigmoid function to each relevancy score R, such as tanh R or $1/(1+e^{-R})$, to normalize the relevancy scores 114.

The system 100 may add a record corresponding to the incoming message 102 to the message feature database 106. Because modification of the message feature database 106 may be a time-consuming process, the system 100 may accumulate incoming messages and periodically (e.g., nightly) add records corresponding to the accumulated incoming messages in a batch.

The storage mechanism 116 may be any kind of mechanism for storing computer-readable data. For example, the storage mechanism 116 may be implemented as a relational database that associates users, messages, and relevancies of the messages to the users. As shown in FIG. 1, the storage mechanism 116 includes the message feature database 106 and the user profiles 112. Either or both of the message feature database 106 and the user profiles 112 may, however, be separate components of the system 100. For example, the message feature database 106 may be a separate component of the system 100 that the similarity engine 104 may directly query using the incoming message 102. Similarly, the user profiles 112 may be a separate component of the system 100 that the relevancy engine 110 may use, in combination with the similarity scores 108, to generate the relevancy scores 114.

The delivery mechanism 118 is now described in more detail. The delivery mechanism 118 evaluates characteristics of units of incoming information (such as the incoming message 102) and determines whether to forward the units of incoming information to particular users based on the users' expressed preferences and the characteristics of the incoming information. For example, in a system in which incoming units of information include incoming email messages, the delivery mechanism 118 may evaluate the relevancy of an incoming email message to a user of the system and determine whether to forward the incoming email message to the user based on the relevancy of the message to the user, the time at which the user last received a message, and the user's expressed preferences for frequency of message delivery.

The delivery mechanism 118 thus provides users with control over the frequency with which incoming information is delivered to them. To provide users with incoming information at the rates indicated by the users' preferences, the delivery mechanism 118 maintains a salience value for each user of the system that specifies a floating relevancy threshold. An incoming unit of information is only delivered to a user if the relevancy of the unit of information to the user exceeds the user's relevancy threshold. The user's salience decays (decreases) over time at a rate specified by the user. As the user's salience decreases, so does the corresponding relevancy threshold, and the likelihood that an incoming unit of information will satisfy the user's relevancy threshold, and thus warrant delivery to the user, increases. When an incoming unit of information satisfies a user's relevancy threshold, the user's salience is increased, thus decreasing the likelihood that an incoming unit of information received by the system in the near future will satisfy the user's relevancy threshold and thus be delivered to the user. Users may interactively adjust their saliences to increase or decrease the frequency with which incoming units of information are delivered to them. This use of salience allows users to interactively influence the rate at which units of information are delivered to them.

Figure 3:
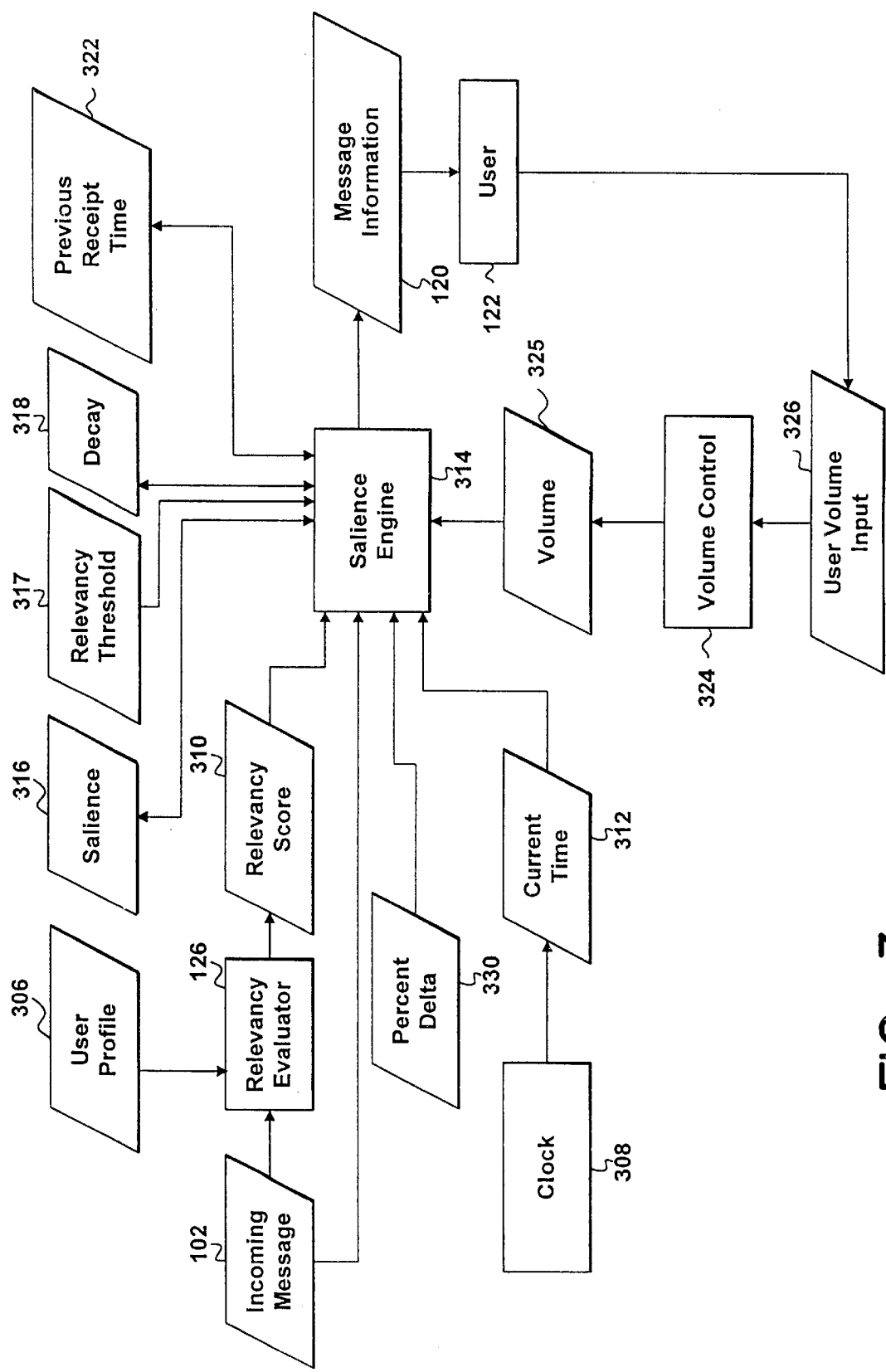
FIG. 3 is a dataflow diagram of a system for regulating a flow of information to a plurality of users.

Referring to FIG. 3, an example of a system 300 for implementing the delivery mechanism 118 is shown. As described in more detail below, a salience engine 314 plays the role of the delivery mechanism 118 shown in FIG. 1. As described above with respect to FIG. 1, the incoming message 102 is delivered as an input to a relevancy evaluator 126. The relevancy evaluator 126 produces a relevancy score 310 based on the incoming message 102 and a user profile 306 indicating preferences of the user 122 for messages previously received by the system 100. As described above with respect to FIG. 1, the system 100 may also serve a plurality of users, in which case the user profile 306 may be one of the user profiles 112 (FIG. 1) and the relevancy score 310 may be one of the relevancy scores 114. A clock 308 delivers the current time 312 as an input to the salience engine 314.

The salience engine 314 generates message information 120 for the user 122 based on the relevancy score 310, the current time 312, a previous receipt time 322 indicating the last time that message information was delivered to the user 122, a salience 316 for the user 122, and a volume 325 indicated by the user 122. The salience engine 314 determines whether the relevancy score 310 satisfies the user's relevancy threshold 317 (which the salience engine 314 derives from the user's salience 316 as described in more detail below). The salience engine 314 may deliver the message information 120 to the user 122 only if the relevancy score 310 satisfies the user's relevancy threshold 317. Alternatively, the salience engine 314 may always deliver the message information 120 to the user 122 and indicate in the message information 120 whether the relevancy score 310 satisfies the user's relevancy threshold 317. The salience engine 314 may generate and deliver message information to other users based on the other users' saliences and volumes.

The message information 120 may, for example, include the incoming message 102 or any information derived therefrom, such as a subject line, keywords, an abstract, or the current receipt time 312 of the incoming message 102. The salience 316, as described in more detail below, specifies the adaptive relevancy threshold 317 that is modified by the salience engine 314 in response to preferences expressed by the user 122 and the rate at which incoming messages are received by the system 100. The salience engine 314 may, for example, deliver the message information 120 to the user 122 only if the relevancy score 310 satisfies the user's relevancy threshold 317. A decay 318, as described in more detail below, is derived from the volume 325 specified by the user 122 and specifies how the salience 316 changes as a function of time.

The salience engine 314 may deliver the message information 120 to the user 122 in any manner. For example, the salience engine 314 may deliver the message information 120 to the user 122 as an email message. Alternatively, the salience engine 314 may maintain a message display for the user 122 that displays a predetermined number of messages that are most relevant to the user 122. For example, when the incoming message 102 is received by the system 100, the salience engine 314 may update the message display to include the message information 120 corresponding to the incoming message 102 only if the relevancy score 310 is greater than the relevancy score of a message currently displayed by the message display. In this way, the message display may be dynamically updated to display to the user those messages that are most relevant to him or her.

The user 122 may control the frequency with the salience engine 314 delivers message information to the user 122. The user 122 may, for example, provide user volume input 326 to a volume control 324 indicating how frequently the user 122 prefers to receive messages. The volume control 324 generates a volume 325 based on the user volume input 326. The volume 325 specifies the frequency with which the user 122 wishes to receive incoming messages. The volume 325 may range from $V_{Min}$ to $V_{Max}$. $V_{Min}$ and $V_{Max}$ may be any values, such as 0 and 1 or 1 and 10. Values of the volume 325 correspond to preferred frequencies of message delivery, such as one per hour or ten per day.

The volume control 324 may include any of a variety of means for receiving the user volume input 326 from the user 122. For example, the volume control 324 may provide a graphical user interface that includes controls for receiving input from the user 122 indicating the volume 325. For example, the graphical user interface may include a slider control or a rotating "volume knob" that the user 122 may use to increase or decrease the volume 325 using a standard input device such as a keyboard or mouse. The volume control 324 may, however, receive or derive the volume 325 from the user volume input 326 in any manner.

The salience engine 314 generates the message information 120 for the incoming message 102 and the user 122 based on the relevancy score 310 for the incoming message 102, the current time 312, the user's salience 316, and the user's volume 325. The salience engine 314 dynamically modifies the salience 316 based on characteristics of the incoming messages received by the system 100 (such as the frequency with which incoming messages are being received by the system 100) and the expressed preferences of the user 122 (as expressed, for example, in the user profiles 306 and the user volume input 326), as described in more detail below.

Figure 4:
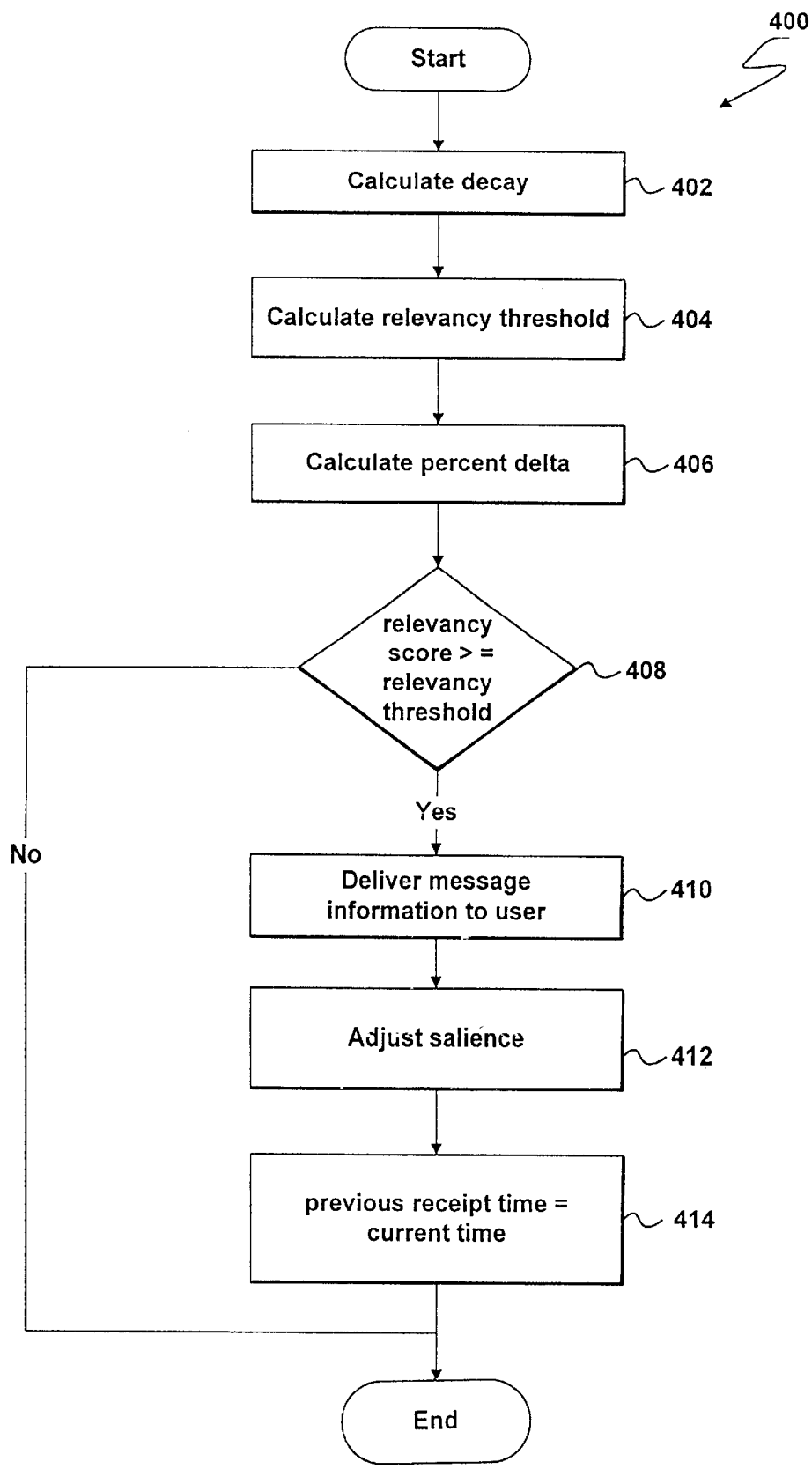
FIG. 4 is a flow chart of a process for regulating a flow of information to a user.

Referring to FIG. 4, one example of a process that the salience engine 314 may use to determine whether to deliver the message information 120 to the user 122 and to update the salience 316 is shown. The salience engine 314 calculates the decay 318 (step 402). As described above, the salience 116 decreases as a function of time. The decay 318 indicates how much the salience engine 314 should decrease the salience 316, based on the time that has passed since message information was last delivered to the user 122 (i.e., since the previous receipt time 322). The salience engine 314 may decrease the salience 316 using any function of time.

One way in which the salience engine 314 may calculate the decay 318 is as follows. Assume for purposes of example that the volume 325 specified by the user volume input 326 ranges from $V_{Min}=0$ to $V_{Max}=1$. If the volume 325 is equal to $V_{Max}$, then the salience engine 314 assigns a value of zero to the decay 318. Otherwise, the volume control 324 assigns a value to the decay 318 using the following formula:

$$\text{decay } (1-(\log(1-V)/24)^{-(current\ time - previous\ time)},$$

where "current time" is the current time 312 obtained from, for example, the clock 308, and "previous time" is the previous message receipt time 322 for the user 122. As described in more detail below, the decay 318 is used as a scaling factor to decrease the salience 316 by an amount reflecting a decreasing function of time. Using this technique for deriving the decay 318 from the user volume input 326, the decay 318 forces the salience to zero if the volume 325 is equal to one, thus allowing all incoming messages to be passed on to the user 122. If the volume 325 is zero, then the decay 318 forces the salience 316 to one, thus preventing any incoming messages from being forwarded to the user 122.

Returning to FIG. 2, the salience engine 314 calculates the user's relevancy threshold 317 based on the user's salience 316 and the user's decay 318 (step 404). The salience engine 314 may, for example, calculate the relevancy threshold 317 as the product of the user's salience 316 and the user's decay 318. The salience engine 314 calculates a percent delta 330 that specifies how the salience 316 is to be adjusted (i.e., increased or decreased) if the relevancy score 310 satisfies the user's relevancy threshold 317 (step 406). The salience engine 314 may, for example, calculate the percent delta 330 from the user's salience 316, decay 318, and the relevancy score 310 using the following formula:

$$\text{percent delta}=\min((\text{relevancy score}-(\text{salience}*\text{decay}))/(\text{salience}-(\text{salience}*\text{decay})),1)$$

The salience engine 314 may, however, calculate a value for the percent delta 330 in any manner.
Furthermore, the percent delta 330 may be partially or entirely specified by the user 122.

If the relevancy score 310 is greater than or equal to the user's relevancy threshold 317 (step 408), then the salience engine 314 delivers the message information 120 to the user 122 (step 410), adjusts the salience 316 (step 412), and updates the previous receipt time 322 to be equal to the current time 312 (step 414). If the relevancy score 310 is less than the user's relevancy threshold 317, the salience engine 314 does not deliver the message information 120 to the user 122.

Figure 5:
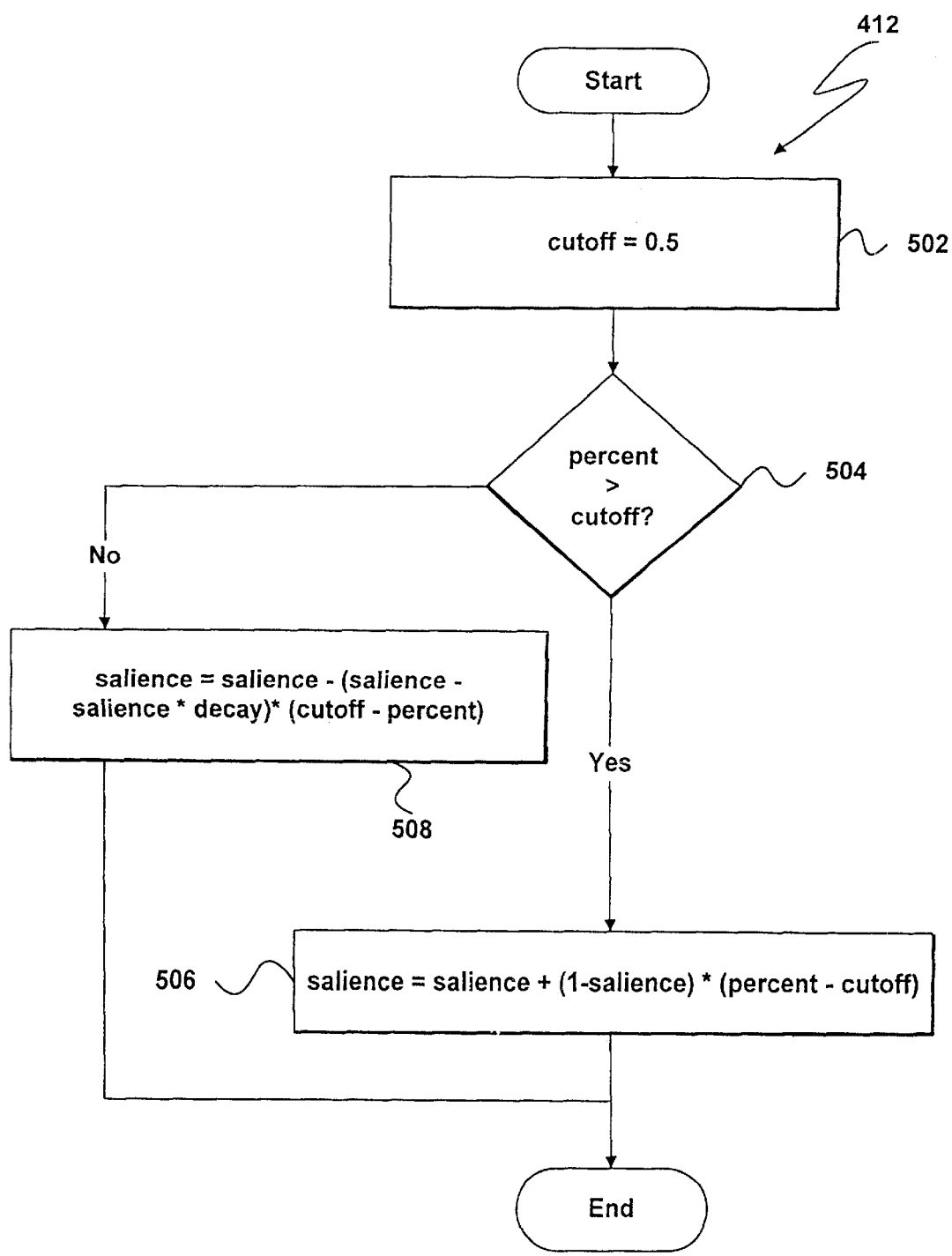
FIG. 5 is a flow chart of a process for implementing aspects of the process shown in FIG. 4.

Referring to FIG. 5, an example of a process for adjusting the salience 316 after delivering the message information 120 to the user 122 (step 412 in FIG. 4) is shown. The process shown in FIG. 5 either increases or decreases the salience 316, depending on the amount of time that has passed since message information was last delivered to the user 122. If message information was delivered to the user 122 relatively recently (i.e., if the user receives message information for a second incoming message relatively quickly after receiving message information for a first incoming message), the salience 316 is increased. If a relatively long amount of time has passed since message information was previously delivered to the user 122, the user's salience 316 is increased. In this way, the system 100 balances the user's desire to obtain relevant information against the user's desire to not be overloaded with information. The process shown in FIG. 5 is provided as an example of a way in which the salience 316 may be adjusted to achieve this balance.

The salience engine 314 initializes a variable named cutoff to a value of 0.5 (step 502). The variable cutoff, as described in more detail below, is used by the salience engine 314 in the process of determining whether to increase or decrease the value of the user's salience 316. Use of the variable cutoff is provided merely as an example of a way in which this determination may be made. Similarly, the variable cutoff may be initialized to any value, and the initial value of 0.5 is provided merely as an example.

If the value of the percent delta 330 is greater than the value of cutoff (step 504), then the salience engine 314 increases the value of the salience 316 using the following formula:

$$\text{salience}=\text{salience}+(1-\text{salience})*(\text{percent delta}-\text{cutoff})$$

(step 506). If the value of the percent delta 330 is less than or equal to the value of cutoff (step 504), then the salience engine 314 decreases the value of the salience 316 using the following formula:

$$\text{salience}=\text{salience}-(\text{salience}-\text{salience}*\text{decay})*(\text{cutoff}-\text{percent})$$

(step 508). The process shown in FIG. 5 adjusts the value of the salience 316 in proportion to the difference between the relevancy score 310 and the relevancy threshold 317. The process shown in FIG. 5, however, is shown merely for purposes of example. The salience engine 314 may use any process to adjust the value of the salience 316.

As described above, when the system 100 includes a plurality of users, a salience, volume, and previous receipt time may be associated with each of the plurality of users. When the incoming message is received 102, the salience engine 314 may monitor the number of users whose relevancy thresholds are satisfied by the corresponding relevancy score of the incoming message 102. The salience engine 314 may use a priority system to select a subset of this number of users and only deliver the message information 120 to this subset of users. The salience engine 314 may, for example, perform load balancing among the plurality of users to distribute the message information 120 among the users to whom the incoming message 102 is particularly relevant in order to prevent any individual user from being overwhelmed with information. The salience engine 314 may use any priority system to determine to which users to deliver the message information based on the relevancy scores of the incoming message 102, the users' saliences, volumes, and previous receipt times, and other information.

The salience engine 314 provides a number of benefits and advantages. For example, by thresholding the relevancy score 310, the salience engine 314 may deliver to the user only those messages that are particularly relevant to him or her. If users of the system 100 typically receive a large number of messages, including a large number of messages that are not sufficiently relevant to them to warrant attention, filtering of insufficiently relevant messages may allow such users to avoid spending a significant amount of time evaluating and/or reading insufficiently relevant messages.

A further advantage of the salience engine 314 is that it may generate the message information 120 for the incoming message 102 without waiting to receive subsequent incoming messages. Conventional systems typically must queue a number of incoming messages before they can generate relevancies for the incoming messages. Such queuing increases the delay between the time that an incoming message is received and the time that the incoming message can be filtered and otherwise processed by the system. The system 100, in contrast, may evaluate the relevancy of a single incoming message (such as the incoming message 102) and deliver or otherwise process the incoming message by itself, before receiving or processing any other incoming messages. As a result, results of evaluating the relevancy of the incoming message 102 may be communicated immediately to users of the system 100, such as by delivering the incoming message 102 to those users for whom the incoming message 102 is sufficiently relevant. Results of evaluating the relevancy of the incoming message 102 may also be communicated to users of the system 100 in other ways, such as by notifying the users of the results by email, facsimile, or telephone.

Another advantage of the salience engine 314 is that it provides the users of the system 100 with interactive control over the frequency with which messages and other information are delivered to them. Systems that allow users to select a fixed relevancy threshold run the risk of providing users with a flood of messages during periods when a large volume of high-relevancy messages are receiving, and similarly run the risk of providing users with too few messages during periods when mostly low-relevancy messages are received. By providing users of the system 100 with the volume control 324 to control the volume (i.e., frequency) of message delivery, the system 100 balances the desire of the user to limit the number of messages received with the need to deliver high-relevancy messages to the user and the desire to deliver lower-relevancy messages to the user when the user is available to read them. Because the volume 125 may be interactively modified by the user and the frequency of message delivery is immediately affected by modification of the volume 325, the user may change the frequency of message delivery, e.g., throughout the day, to suit the user's preferences and availability.

A further advantage of the salience engine 314 is that the only state information that it needs to maintain for the user 122 is the user's salience 316, the previous receipt time 122 of a message by the user 122, and the user's volume 325, regardless of the frequency of incoming messages being received by the system or the number of incoming messages previously received by the system. Such state information will typically require only a small and constant amount of memory to store. Using such state information to regulate the flow of information to the user 122 therefore requires relatively little memory, regardless of the frequency of incoming messages or the number of messages previously received by the user. If the system 100 includes a plurality of users, the system 100 need only maintain the state information described above for each of the users. Memory requirements of the system 100 therefore remain relatively low even when the system has a large number of users.

A computer system for implementing the system 100 of FIG. 1 typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include cathode ray tubes (CRT) display, liquid crystal displays (LCD) and other video output devices, printers, communication devices such as a modem, storage devices such as a disk or tape and audio output. It should also be understood that one or more input devices may be connected to the computer system. Example input devices include a keyboard, keypad, track ball, mouse, pen and tablet, communication device, and data input devices such as audio and video capture devices. It should be understood that the invention is not limited to the particular input or output devices used in combination with the computer system or to those described herein.

The computer system may be a general purpose computer system which is programmable using a computer programming language, such as C, C++, Java, or other language, such as a scripting language or even assembly language. The computer system may also be specially programmed, special purpose hardware, or an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory, and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

The foregoing description of a few embodiments is merely illustrative and not limiting, having been presented by way of example only. Numerous modifications and other embodiments are within the scope of one of ordinary skill in the art and are contemplated as falling within the scope of the invention.

What is claimed is:

1. A method of providing information to at least one of a plurality of users of a system based on the relevancy of the information to the plurality of users, the system having a message feature database including a plurality of records, each record descriptive of the features of a message, and having a user profiles database including a plurality of user profiles, each user profile including information descriptive of one of the plurality of user's preferences for the features of the messages described by the plurality of records, the method comprising steps of:

(A) receiving an incoming message from a user;

(B) generating a plurality of similarity scores, each similarly score indicating a similarity of the incoming message to the features of a message described by one of the plurality of records, including, for each record, comparing the incoming message to the features of the message described by the record;

(C) generating relevancy scores for the plurality of users, each relevancy score indicating a relevancy of the incoming message to one of the plurality of users based on the similarity scores and the user profile of the user, including comparing each user profile to the similarity scores to generate each respective relevancy score; and (D) delivering, to the at least one of the plurality of users, message information derived from the incoming message, the relevancy scores, and the plurality of user profiles.

2. The method of claim 1, wherein the step (B) comprises steps of:

(B)(1) querying the message feature database using the incoming message to develop search results; and (B)(2) generating the relevancy scores based on the search results.

3. The method of claim 1, wherein the plurality of user profiles include a preference matrix indicating preferences of the plurality of users for the features of the messages described by the records of the message feature database, and wherein the step (C) comprises a step of:

(C)(1) generating the relevancy scores by performing vector multiplication of a vector representing the similarity scores by vectors in the preference matrix.

4. The method of claim 1, further comprising steps of:

(E) receiving user feedback from one of the plurality of users; and (F) modifying the one user's profile in the user profiles database based on the user feedback.

5. The method of claim 4, wherein the step (E) comprises a step of receiving an indication from the one user that are the user has expressed a positive preference for the message information.

6. The method of claim 4, wherein the step (E) comprises a step of receiving an indication from the one user that the one user has expressed a negative preference for the message information.

7. The method of claim 1, wherein each user profile includes a relevancy threshold for one of the plurality of users, and wherein the step (D) comprises steps of:

(D)(1) for each user, comparing the relevancy score for the user to the relevancy threshold of the user; and (D)(2) delivering the message information only to each user whose relevancy score satisfies the user's relevancy threshold.

8. The method of claim 1, wherein the user profiles database includes a maximum number of users to whom the message information is to be delivered, and wherein the step (D) comprises a step of:

(D)(1) delivering the message information to no greater than the maximum number of users.

9. The method of claim 1, wherein the user profiles database includes a minimum number of users to whom the message information is to be delivered, and wherein the step (D) comprises a step of:

(D)(1) delivering the message information to no fewer than the minimum number of users.

10. The method of claim 1, wherein the step (D) comprises a step of sending the message information to the at least one of the plurality of users as at least one electronic mail message.

11. The method of claim 1, wherein the step (D) comprises a step of:

(D)(1) displaying the message information to a particular one of the plurality of users in a message display.

12. The method of claim 11, wherein the step (D)(1) comprises a step of: displaying the message information to the particular one of the plurality of users in a message display that indicates the relevancy score of the incoming message for the particular one of the plurality of users in relation to relevancy scores of other messages for the particular one of the plurality of users.

13. The method of claim 1, wherein the step (D) comprises a step of:

(D)(1) responding to a request from a process executing on a client computer for message information satisfying specified criteria.

14. The method of claim 13, wherein the process is associated with a particular one of the plurality of users, and wherein the step (D)(1) comprises a step of responding to a request from the process executing on the client computer for message information corresponding to a specified number of messages having optimal relevancy scores for the particular one of the plurality of users.

15. A system for providing information to at least one of a plurality of users based on the relevancy of the information to the plurality of users, the system comprising:

a message feature database including a plurality of records, each record descriptive of features of a plurality of messages;

a similarity engine having an input to receive an incoming message from a user and an output to deliver similarity scores, each similarity score indicating a similarity of the incoming message to the features of a message described by one of the plurality of records wherein the similarity engine is operable, for each record, to compare the incoming message to the features of the message described by the record;

a user profiles database including profiles of the plurality of users, each user profile including information descriptive of one of the plurality of user's preferences for the features of the messages described by the plurality of records;

a relevancy engine having a first input to receive the similarity scores, a second input to receive the profiles from the user profiles database, and an output to deliver relevancy scores, each relevancy score indicating a relevancy of the incoming message to one of the plurality of users, wherein the relevancy engine is operable to compare each user profile to the similarity scores to generate each respective relevancy score; and a delivery mechanism having a first input to receive the incoming message, a second input to receive the relevancy scores, a third input to receive the profiles of the plurality of users, and an output to deliver, to the at least one of the plurality of users, message information derived from the incoming message, the relevancy scores, and the plurality of user profiles.

16. The system of claim 15, wherein the similarity engine is adapted to query the message feature database using the incoming message to develop search results and to generate the relevancy scores based on the search results.

17. The system of claim 15, wherein the user profiles database includes a preference matrix indicating preferences of the plurality of users for the features of the messages described by the records of the message feature database, and wherein the relevancy engine is adapted to generate the relevancy scores by performing vector multiplication of a vector representing the similarity scores by vectors in the preference matrix.

18. The system of claim 15, wherein the user profiles database is adapted to modify one of the plurality of user profiles in the user profiles database based on user feedback received from one of the plurality of users.

19. The system of claim 18, wherein the user feedback comprises an indication from the one user that the one user has expressed a positive preference for the message information.

20. The system of claim 18, wherein the user feedback comprises an indication from the one user that the one user has expressed a negative preference for the message information.

21. The system of claim 15, wherein the user profiles database includes a relevancy threshold for each of the plurality of users, and wherein the delivery mechanism is adapted to compare the relevancy score for each user to the relevancy threshold of the user, and to deliver the message information only to each user whose relevancy score satisfies the user's relevancy threshold.

22. The system of claim 15, wherein the user profiles database includes a maximum number of users to whom the message information is to be delivered, and wherein the delivery mechanism is adapted to deliver the message information to no greater than the maximum number of users.

23. The system of claim 15, wherein the user profiles database includes a minimum number of users to whom the message information is to be delivered, and wherein the delivery mechanism is adapted to deliver the message information to no fewer than the minimum number of users.

24. The system of claim 15, wherein the delivery mechanism is adapted to send the message information to the at least one of the plurality of users as at least one electronic mail message.

25. The system of claim 15, wherein the delivery mechanism is adapted to display the message information to a particular one of the plurality of users in a message display.

26. The system of claim 25, wherein the delivery mechanism is adapted to display the message information to the particular one of the plurality of users in a message display that indicates the relevancy score of the incoming message for the particular one of the plurality of users in relation to relevancy scores of other messages for the particular one of the plurality of users.

27. The system of claim 15, wherein the delivery mechanism is adapted to respond to a request from a process executing on a client computer for message information satisfying specified criteria.

28. The system of claim 27, wherein the process is associated with a particular one of the plurality of users, and wherein the delivery mechanism is adapted to respond to a request from the process executing on the client computer for message information corresponding to a specified number of messages having optimal relevancy scores for the particular one of the plurality of users.

29. A computer-readable medium encoded with a program for execution on a computer processor, wherein the program, when executed on the computer processor, performs a method of providing information to at least one of a plurality of users of a system based on the relevancy of the information to the plurality of users, the system having a message feature database including a plurality of records, each record descriptive of the features of a message, and having a user profiles database including a plurality of user profiles each user profile including information descriptive of one of the plurality of user's preferences for the features of the messages described by the plurality of records, the method comprising steps of:

(A) receiving an incoming message from a user;

(B) generating a plurality of similarity scores, each similarly score indicating a similarity of the incoming message to the features of a message described by one of the plurality of records, including, for each record, comparing the incoming message to the features of the message described by the record;

(C) generating relevancy scores for the plurality of users, each relevancy score indicating a relevancy of the incoming message to one of the plurality of users based on the similarity scores and the user profile of the user including comparing each user profile to the similarity scores to generate each respective relevancy score; and (D) delivering, to the at least one of the plurality of users, message information derived from the incoming message, the relevancy scores, and the plurality of user profiles.

30. The computer-readable medium of claim 29, wherein the step (B) comprises steps of:

(B)(1) querying the message feature database using the incoming message to develop search results; and (B)(2) generating the relevancy scores based on the search results.

31. The computer-readable medium of claim 29, wherein the plurality of user profiles include a preference matrix indicating preferences of the plurality of users ,for the features of the messages described by the records of the message feature database, and wherein the step (C) comprises a step of:

(C)(1) generating the relevancy scores by performing vector multiplication of a vector representing the similarity scores by vectors in the preference matrix.

32. The computer-readable medium of claim 29, wherein the method further comprises steps of:

(E) receiving user feedback from one of the plurality of users; and (F) modifying the one user's profile in the user profiles database based on the user feedback.

33. The computer-readable medium of claim 32, wherein the step (E) comprises a step of receiving an indication from the one user that the one user has expressed a positive preference for the message information.

34. The computer-readable medium of claim 32, wherein the step (E) comprises a step of receiving an indication from the one user that the one user has expressed a negative preference for the message information.

35. The computer-readable medium of claim 29, wherein each user profile includes a relevancy threshold for one of the plurality of users, and wherein the step (D) comprises steps of:
   (D)(1) for each user, comparing the relevancy score for the user to the relevancy threshold of the user; and
   (D)(2) delivering the message information only to each user whose relevancy score satisfies the user's relevancy threshold.

36. The computer-readable medium of claim 29, wherein the user profiles database includes a maximum number of users to whom the message information is to be delivered, and wherein the step (D) comprises a step of:
   (D)(1) delivering the message information to no greater than the maximum number of users.

37. The computer-readable medium of claim 29, wherein the user profiles database includes a minimum number of users to whom the message information is to be delivered, and wherein the step (D) comprises a step of:
   (D)(1) delivering the message information to no fewer than the minimum number of users.

38. The computer-readable.medium of claim 29, wherein the step (D) comprises a step of sending the message information to the at least one of the plurality of users as at least one electronic mail message.

39. The computer-readable medium of claim 29, wherein the step (D) comprises a step of:
   (D)(1) displaying the message information to a particular one of the plurality of users in a message display.

40. The computer-readable medium of claim 39, wherein the step (D)(1) comprises a step of:
   displaying the message information to the particular one of the plurality of users in a message display that indicates the relevancy score of the incoming message for the particular one of the plurality of users in relation to relevancy scores of other messages for the particular one of the plurality of users.

41. The computer-readable medium of claim 29, wherein the step (D) comprises a step of:
   (D)(1) responding to a request from a process executing on a client computer for message information satisfying specified criteria.

42. The computer-readable medium of claim 41, wherein the process is associated with a particular one of the plurality of users, and wherein the step (D)(1) comprises a step of responding to a request from the process executing on the client computer for message information corresponding to a specified number of messages having optimal relevancy scores for the particular one of the plurality of users.

43. A system for providing information to at least one of a plurality of users based on the relevancy of the information to the plurality of users, the system having a message feature database including a plurality of records, each record descriptive of the features of a message, and having a user profiles database including a plurality of user profiles each user profile including information descriptive of one of the plurality of user's preferences for the features of the messages described by the plurality of records, the system comprising:
   (A) means for receiving an incoming message from a user;
   (B) means for generating a plurality of similarity scores each similarly score indicating a similarity of the incoming message to the features of a message described by one of the plurality of records, including means for comparing, for each record, the incoming message to the features of the message described by the record;
   (C) means for generating relevancy scores for the plurality of users, each relevancy score indicating a relevancy of the incoming message to one of the plurality of users based on the similarity scores and the user profile of the user, including means for comparing each user profile to the similarity scores to generate each respective relevancy score; and
   (D) means for delivering, to the at least one of the plurality of users, message information derived from the incoming message, the relevancy scores, and the plurality of user profiles.

44. The system of claim 43, wherein the means for generating similarity scores comprises:
   means for querying the message feature database using the incoming message to develop search results; and
   means for generating the relevancy scores based on the search results.

45. The system of claim 43, wherein the plurality of user profiles include a preference matrix indicating preferences of the plurality of users for the features of the messages described by the records of the message feature database, and wherein the means for generating relevancy scores comprises:
   means for generating the relevancy scores by performing vector multiplication of a vector representing the similarity scores by vectors in the preference matrix.

46. The system of claim 43, further comprising:
   means for receiving user feedback from one of the plurality of users; and
   means for modifying the one user's profile in the user profiles database based on the user feedback.

47. The system of claim 46, wherein the means for receiving user feedback comprises means for receiving an indication from the one user that the one user has expressed a positive preference for the message information.

48. The system of claim 46, wherein the means for receiving user feedback comprises means for receiving an indication from the user that the user has expressed a negative preference for the message information.

49. The system of claim 43, wherein each user profile includes a relevancy threshold for the user, and wherein the means for delivering message information comprises means for comparing, for each user, the relevancy score to the user's relevancy threshold, and means for delivering the message information only to each user whose relevancy score satisfies the user's relevancy threshold.

50. The system of claim 43, wherein the user profiles database includes a maximum number of users to whom the message information is to be delivered, and wherein the step (D) comprises means for delivering the message information to no greater than the maximum number of users.

51. The system of claim 43, wherein the user profiles database includes a minimum number of users to whom the message information is to be delivered, and wherein the means for delivering message information comprises means for delivering the message information to no fewer than the minimum number of users.

52. The system of claim 43, wherein the means for delivering message information comprises means for sending the message information to the at least one of the plurality of users as at least one electronic mail message.

53. The system of claim 43, wherein the means for delivering message information comprises means for displaying the message information to a particular one of the plurality of users in a message display.

54. The system of claim 53, wherein the means for displaying the message information comprises means for displaying the message information to the particular one of the plurality of users in a message display that indicates the relevancy score of the incoming message for the particular one of the plurality of users in relation to relevancy scores of other messages for the particular one of the plurality of users.

55. The system of claim 43, wherein the means for delivering message information comprises means for responding to a request from a process executing on a client computer for message information satisfying specified criteria.

56. The system of claim 55, wherein the process is associated with a particular one of the plurality of users, and wherein the means for responding comprises means for responding to a request from the process executing on the client computer for message information corresponding to a specified number of messages having optimal relevancy scores for the particular one of the plurality of users.

57. In a system including a relevancy threshold for a user, a method of providing information to the user based on the relevancy of the information to the user, the method comprising steps of:
 (A) receiving an incoming message;
 (B) generating a relevancy score for the user, the relevancy score indicating a relevancy of the incoming message to the user;
 (C) determining whether the relevancy score of the incoming message satisfies the relevancy threshold; and
 (D) if the relevancy score satisfies the relevancy threshold, delivering to the user message information derived from the incoming message and automatically adjusting the relevancy threshold in response to the threshold being satisfied.

58. The method of claim 57, further comprising step of:
 (E) adjusting the relevancy threshold by an amount determined by a time-dependent function when the relevancy score of the incoming message does not satisfy the relevancy threshold.

59. The method of claim 57, wherein the step (D) comprises a step of:
 (D)(1) adjusting the relevancy threshold by a function of the difference between the relevancy threshold and a maximum relevancy value.

60. The method of claim 57, wherein the step (D) comprises a step of:
 (D)(1) adjusting the relevancy threshold by a function of the difference between the relevancy threshold and an amount determined by a time-dependent function of the relevancy threshold.

61. A computer-readable medium encoded with a computer program for execution on a computer processor in a computer system including a relevancy threshold for a user, wherein the program, when executed on the computer processor, performs a method of providing information to the user based on the relevancy of the information to the user, the method comprising steps of:
 (A) receiving an incoming message;
 (B) generating a relevancy score for the user, the relevancy score indicating a relevancy of the incoming message to the user;
 (C) determining whether the relevancy score of the incoming message satisfies the relevancy threshold; and
 (D) if the relevancy score satisfies the relevancy threshold, delivering to the user message information derived from the incoming message and automatically adjusting the relevancy threshold in response to the threshold being satisfied.

62. The computer-readable medium of claim 61, wherein the method further comprising a step of:
 (E) adjusting the relevancy threshold by an amount determined by a time-dependent function when the relevancy score of the incoming message does not satisfy the relevancy threshold.

63. The computer-readable medium of claim 61, wherein the step (D) comprises a step of:
 (D)(1) adjusting the relevancy threshold by a function of the difference between the relevancy threshold and a maximum relevancy value.

64. The computer-readable medium of claim 61, wherein the step (D) comprises a step of:
 (D)(1) adjusting the relevancy threshold by a function of the difference between the relevancy threshold and an amount determined by a time-dependent function of the relevancy threshold.

65. A system for providing information to the user based on the relevancy of the information to the user, the system comprising:
 means for receiving an incoming message;
 means for generating a relevancy score for the user, the relevancy score indicating a relevancy of the incoming message to the user;
 means for determining whether the relevancy score of the incoming message satisfies a relevancy threshold for the user; and
 means for delivering to the user message information derived from the incoming message and automatically adjusting the relevancy threshold in the event that the relevancy score satisfies the relevance threshold.

66. The system of claim 65, further comprising a step of:
 means for adjusting the relevancy threshold by an amount determined by a time-dependent function when the relevancy score of the incoming message does not satisfy the relevancy threshold.

67. The system of claim 65, wherein the means for delivering comprises:
 means for adjusting the relevancy threshold by a function of the difference between the relevancy threshold and a maximum relevancy value.

68. The system of claim 65, wherein the means for delivering comprises:
 means for adjusting the relevancy threshold by a function of the difference between the relevancy threshold and an amount determined by a time-dependent function of the relevancy threshold.

69. In a system including a relevancy threshold for a user, a method of providing information to the user based on the relevancy of the information to the user, the method comprising steps of:
 (A) receiving an incoming message;
 (B) generating a relevancy score for the user, the relevancy score indicating a relevancy of the incoming message to the user;

(C) calculating the relevancy threshold as a predefined decay function of time;

(D) determining whether the relevancy score of the incoming message satisfies the relevancy threshold; and (E) delivering the incoming message to the user when the relevancy score of the incoming message satisfies the relevancy threshold.

70. The method of claim 69, wherein the step (C) comprises a step of:

(C)(1) calculating the relevancy threshold as a function of time that is specified by the user.

71. The method of claim 70, wherein the step (C)(1) comprises steps of:

receiving user volume input from the user, the user volume input indicating a desired frequency of message delivery to the user; and calculating the function of time based on the user volume input.

72. A computer-readable medium encoded with a computer program for execution on a computer processor in a system including a relevancy threshold for a user, wherein the program, when executed on the computer processor, performs a method of providing information to the user based on the relevancy of the information to the user, the method comprising steps of:

(A) receiving an incoming message;

(B) generating a relevancy score for the user, the relevancy score indicating a relevancy of the incoming message to the user, (C) calculating the relevancy threshold as a predefined decay function of time;

(D) determining whether the relevancy score of the incoming message satisfies the relevancy threshold; and (E) delivering the incoming message to the user when the relevancy score of the incoming message satisfies the relevancy threshold.

73. The computer-readable medium of claim 72, wherein the step (C) comprises a step of:

(C)(1) calculating the relevancy threshold as a function of time that is specified by the user.

74. The computer-readable medium of claim 73, wherein the step (C)(1) comprises steps of:

receiving user volume input from the user, the user volume input indicating a desired frequency of message delivery to the user; and calculating the function of time based on the user volume input.

75. A system for providing information to the user based on the relevancy of the information to the user, the system comprising:

means for receiving an incoming message;

means for generating a relevancy score for the user, the relevancy score indicating a relevancy of the incoming message to the user;

means for calculating the relevancy threshold as a predefined decay function of time;

means for determining whether the relevancy score of the incoming message satisfies a relevancy threshold for the user; and means for delivering the incoming message to the user when the relevancy score of the incoming message satisfies the relevancy threshold.

76. The system of claim 75, wherein the means for calculating comprises:

means for calculating the relevancy threshold as a function of time that is specified by the user.

77. The system of claim 76, wherein the means for calculating comprises:

means for receiving user volume input from the user, the user volume input indicating a desired frequency of message delivery to the user; and means for calculating the function of time based on the user volume input.

78. In a system including a relevancy threshold for a user, a method of providing information to the user based on the relevancy of the information to the user, the method comprising steps of:

(A) receiving a plurality of incoming messages;

(B) generating relevancy scores for the plurality of messages, the relevancy scores indicating relevancies of the plurality of incoming messages to the user; and (C) delivering to the user message information derived from at least some of the incoming messages having relevancy scores satisfying the relevancy threshold, including controlling a frequency at which the user receives messages based on a value specified by the user.

79. In a system including a relevancy threshold for a user, a method of providing information to the user based on the relevancy of the information to the user, the method comprising steps of:

(A) receiving a plurality of incoming messages;

(B) generating relevancy scores for the plurality of messages, the relevancy scores indicating relevancies of the plurality of incoming messages to the user; and (C) delivering to the user message information derived from at least some of the incoming messages having relevancy scores satisfying the relevancy threshold at a rate specified by the user;

wherein the step (C) comprises steps of:

(C)(1) calculating the relevancy threshold as a predefined decay function of time;

(C)(2) determining whether the relevancy scores of the incoming messages satisfy the relevancy threshold;

(C)(3) delivering to the user message information derived from those incoming messages whose relevancy scores satisfy the relevancy threshold; and (C)(4) adjusting the relevancy threshold when it is determined in the step (C)(2) that at least one of the relevancy scores satisfies the relevancy threshold.

80. The method of claim 79, wherein the step (C)(1) comprises a step of:

(C)(1)(a) calculating the relevancy threshold as a function of time that is specified by the user.

81. The method of claim 80, wherein the step (C)(1)(a) comprises steps of:

receiving user volume input from the user, the user volume input indicating a desired frequency of message delivery to the user; and calculating the function of time based on the user volume input.

82. The method of claim 79, wherein the step (C)(4) comprises a step of:

adjusting the relevancy threshold by a function of the difference between the relevancy threshold and a maximum relevancy value.

83. The method of claim 79, wherein the step (C)(4) comprises a step of:
adjusting the relevancy threshold by an amount specified by the user.

84. A computer-readable medium encoded with a computer program for execution on a computer processor in a system including a relevancy threshold for a user, wherein the program, when executed on the computer processor, performs a method of providing information to the user based on the relevancy of the information to the user, the method comprising steps of:
(A) receiving a plurality of incoming messages;
(B) generating relevancy scores for the plurality of messages, the relevancy scores indicating relevancies of the plurality of incoming messages to the user; and
(C) delivering to the user message information derived from at least some of the incoming messages having relevancy scores satisfying the relevancy threshold, including controlling a frequency at which the user receives messages based on a value specified by the user.

85. A computer-readable medium encoded with a computer program for execution on a computer processor in a system including a relevancy threshold for a user, wherein the program, when executed on the computer processor, performs a method of providing information to the user based on the relevancy of the information to the user, the method comprising steps of:
(A) receiving a plurality of incoming messages;
(B) generating relevancy scores for the plurality of messages, the relevancy scores indicating relevancies of the plurality of incoming messages to the user; and
(C) delivering to the user message information derived from at least some of the incoming messages having relevancy scores satisfying the relevancy threshold at a rate specified by the user;
wherein the step (C) comprises steps of:
(C)(1) calculating the relevancy threshold as a predefined decay function of time;
(C)(2) determining whether the relevancy scores of the incoming messages satisfy the relevancy threshold;
(C)(3) delivering to the user message information derived from those incoming messages whose relevancy scores satisfy the relevancy threshold; and
(C)(4) adjusting the relevancy threshold when it is determined in the step
(C)(2) that at least one of the relevancy scores satisfies the relevancy threshold.

86. The computer-readable medium of claim 85, wherein the step (C)(1) comprises a step of:
(C)(1)(a) calculating the relevancy threshold as a function of time that is specified by the user.

87. The computer-readable medium of claim 86, wherein the step (C)(1)(a) comprises steps of:
receiving user volume input from the user, the user volume input indicating a desired frequency of message delivery to the user; and
calculating the function of time based on the user volume input.

88. The computer-readable medium of claim 85, wherein the step (C)(4) comprises a step of:
adjusting the relevancy threshold by a function of the difference between the relevancy threshold and a maximum relevancy value.

89. The computer-readable medium of claim 85, wherein the step (C)(4) comprises a step of:
adjusting the relevancy threshold by an amount specified by the user.

90. A system for providing information to the user based on the relevancy of the information to the user, the system comprising:
means for receiving a plurality of incoming messages;
means for generating relevancy scores for the plurality of messages, the relevancy scores indicating relevancies of the plurality of incoming messages to the user; and
means for delivering to the user message information derived from at least some of the incoming messages having relevancy scores satisfying the relevancy threshold, including means for controlling a frequency at which the user receives messages based on a value specified by the user.

91. A system for providing information to the user based on the relevancy of the information to the user, the system comprising:
means for receiving a plurality of incoming messages;
means for generating relevancy scores for the plurality of messages, the relevancy scores indicating relevancies of the plurality of incoming messages to the user; and
means for delivering to the user message information derived from at least some of the incoming messages having relevancy scores satisfying the relevancy threshold at a rate specified by the user;
wherein the means for delivering comprises:
means for calculating the relevancy threshold as a predefined decay function of time;
means for determining whether the relevancy scores of the incoming messages satisfy the relevancy threshold;
means for delivering to the user message information derived from those incoming messages whose relevancy scores satisfy the relevancy threshold; and
means for adjusting the relevancy threshold when it is determined in the step (C)(2) that at least one of the relevancy scores satisfies the relevancy threshold.

92. The system of claim 91, wherein the means for calculating comprises:
means for calculating the relevancy threshold as a function of time that is specified by the user.

93. The system of claim 92, wherein the means for calculating comprises:
means for receiving user volume input from the user, the user volume input indicating a desired frequency of message delivery to the user; and
means for calculating the function of time based on the user volume input.

94. The system of claim 91, wherein the means for adjusting comprises:
means for adjusting the relevancy threshold by a function of the difference between the relevancy threshold and a maximum relevancy value.

95. The system of claim 91, wherein the means for adjusting comprises:
means for adjusting the relevancy threshold by an amount specified by the user.

96. A system for providing information to a user based on the relevancy of the information to the user, the system comprising:
a user profiles database including a relevancy threshold for the user;
a relevancy engine having an output to deliver a relevancy score indicating a relevancy of an incoming message to the user;

a delivery mechanism having a first input to receive the incoming message, a second input to receive the relevancy score, and an output operable, in the event that the relevancy score satisfies the relevancy threshold, to deliver to the user message information derived from the incoming message and to automatically adjust the relevancy threshold.

97. The system of claim 96, wherein the delivery mechanism is adapted to adjust the relevancy threshold by an amount determined by a time-dependent function when the relevancy score of the incoming message does not satisfy the relevancy threshold.

98. The system of claim 96, wherein the salience engine is adapted to adjust the relevancy threshold by a function of the difference between the relevancy threshold and a maximum relevancy value.

99. The system of claim 96, wherein the delivery mechanism is adapted to adjust the relevancy threshold by a function of the difference between the relevancy threshold and an amount determined by a time-dependent function of the relevancy threshold.

100. A system for providing information to a user based on the relevancy of the information to the user, the system comprising:

a user profiles database including a relevancy threshold for the user;

a relevancy engine having an output to deliver a relevancy score indicating a relevancy of an incoming message to the user; and a delivery mechanism to calculate the relevancy threshold as a predefined decay function of time, determine whether the relevancy score of the incoming message satisfies the relevancy threshold, and deliver the incoming message to the user when the relevancy score of the incoming message satisfies the relevancy threshold.

101. The system of claim 100, wherein the delivery mechanism is adapted to calculate the relevancy threshold as a function of time that is specified by the user.

102. The system of claim 101, wherein the delivery mechanism is adapted to receive user volume input from the user, the user volume input indicating a desired frequency of message delivery to the user, and to calculate the function of time based on the user volume input.

103. A system for providing information to a user based on the relevancy of the information to the user, the system comprising:

a user profiles database including a relevancy threshold for the user;

a relevancy engine having an output to deliver relevancy scores for a plurality of messages, the relevancy scores indicating relevancies of a plurality of incoming messages to the user; and a delivery mechanism to deliver to the user message information derived from at least some of the incoming messages having relevancy scores satisfying the relevancy threshold and to control a frequency at which the user receives messages based on a value specified by the user.

104. A system for providing information to a user based on the relevancy of the information to the user, the system comprising:

a user profiles database including a relevancy threshold for the user;

a relevancy engine having an output to deliver relevancy scores for a plurality of messages, the relevancy scores indicating relevancies of a plurality of incoming messages to the user; and a delivery mechanism to deliver to the user message information derived from at least some of the incoming messages having relevancy scores satisfying the relevancy threshold at a rate specified by the user;

wherein the delivery mechanism is adapted to calculate the relevancy threshold as a predefined decay function of time, determine whether the relevancy scores of the incoming messages satisfy the relevancy threshold, deliver to the user message information derived from those incoming messages whose relevancy scores satisfy the relevancy threshold, and adjust the relevancy threshold when it is determined that at least one of the relevancy scores satisfies the relevancy threshold.

105. The system of claim 104, wherein the delivery mechanism is adapted to calculate the relevancy threshold as a function of time that is specified by the user.

106. The system of claim 105, wherein the delivery mechanism is adapted to receive user volume input from the user, the user volume input indicating a desired frequency of message delivery to the user, and calculate the function of time based on the user volume input.

107. The system of claim 104, wherein the delivery mechanism is adapted to adjust the relevancy threshold by a function of the difference between the relevancy threshold and a maximum relevancy value.

108. The system of claim 104, wherein the delivery mechanism is adapted to adjust the relevancy threshold by an amount specified by the user.

* * * * *

UNITED STATES PATENT AND TRADEMARK OFFICE
CERTIFICATE OF CORRECTION

PATENT NO.     : 6,578,025 B1
DATED          : June 10, 2003
INVENTOR(S)    : Pollack et al.

It is certified that error appears in the above-identified patent and that said Letters Patent is hereby corrected as shown below:

Column 20,
Line 53, replace "user ,for" with -- users, for --;

Column 22,
Line 28, replace "computer-readable.medium" with -- computer-readable medium --;

Column 25,
Line 45, replace "comprising step" with -- comprising a step --.

Signed and Sealed this

Eleventh Day of November, 2003

JAMES E. ROGAN
*Director of the United States Patent and Trademark Office*